United States Patent [19]
Gaston

[11] Patent Number: 5,627,719
[45] Date of Patent: May 6, 1997

[54] ELECTRICAL WIRING SYSTEM WITH OVERTEMPERATURE PROTECTION

[76] Inventor: William R. Gaston, P.O. Box 344, Marco Island, Fla. 33969

[21] Appl. No.: 490,318

[22] Filed: Jun. 13, 1995

Related U.S. Application Data

[62] Division of Ser. No. 107,911, Aug. 17, 1993, Pat. No. 5,424,895.

[51] Int. Cl.$^6$ ............................................. H02H 5/04
[52] U.S. Cl. ............................................. 361/103; 361/104
[58] Field of Search ............................... 361/46, 50, 103, 361/104, 48; 324/538, 541, 515, 539; 340/652, 651, 650, 649; 219/539; 174/256, 263, 103, 121 A, 126.1, 128.1, 128.2; 156/49

[56] References Cited

U.S. PATENT DOCUMENTS

| | | | |
|---|---|---|---|
| 3,676,739 | 7/1972 | Neuhauser | 361/50 |
| 3,891,894 | 6/1975 | Scarpino | 361/50 |
| 4,075,675 | 2/1978 | Burkett et al. | 361/48 |
| 4,518,445 | 5/1985 | Pedersen | 156/49 |
| 4,547,658 | 10/1985 | Crowley | 219/539 |

*Primary Examiner*—Jeffrey A. Gaffin
*Assistant Examiner*—Stephen Jackson
*Attorney, Agent, or Firm*—James H. Beusse

[57] ABSTRACT

A household electrical service (10) is protected against overheating by running a sensor line or wire (36 or 38), coextensively together with hot, neutral and ground lines or wires (12, 13, 14 or 31, 32, 33), from a power company hookup (50) to a main breaker switch (18), and from respective branch circuit breakers (19) throughout the branch circuits (21, 22). The sensor line or wire (36 or 38) may be a length of heat fusible or otherwise temperature variant material which has a load end connected to ground and a source end connected to a control circuit (51) which trips the breaker (18 or 19) when an overtemperature condition melts the wire. Protection is extended through to individual devices (43) by continuing the sensor wire through the device cord (42). For this purpose, a plug ground prong (46) and receptacle ground prong connection (45) provide isolated ground and sensor wire connections. In a modified installation, fiber optic paths (38') are used in place of conductive wires and LED circuits replace load end ground connection.

4 Claims, 2 Drawing Sheets

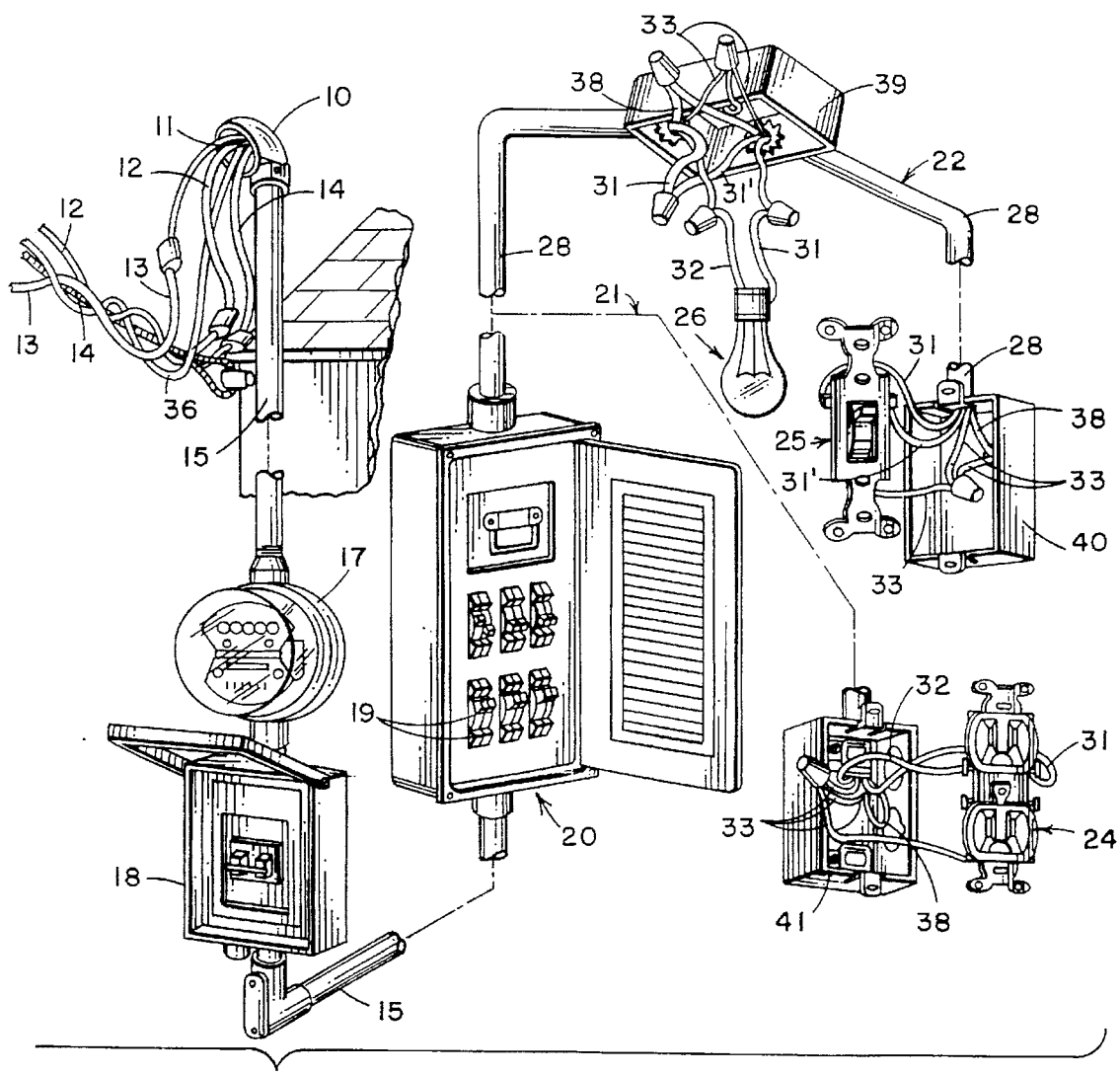
FIG. 1
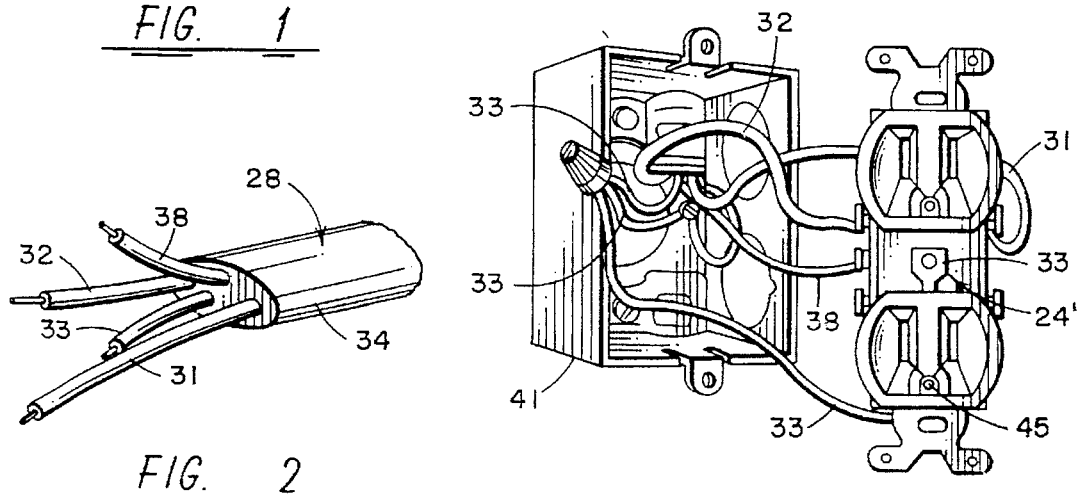
FIG. 2
FIG. 3

ELECTRICAL WIRING SYSTEM WITH OVERTEMPERATURE PROTECTION

This is a divisional of application Ser. No. 08/107,911 filed Aug. 17, 1993 U.S. Pat. No. 5,424,895.

This invention relates, in general, to electrical wiring systems; and, in particular, to a system such as a household electrical wiring system including a temperature sensing mechanism for detecting an overtemperature condition and automatically interrupting an electrical circuit in response thereto.

BACKGROUND OF THE INVENTION

A typical electrical service for a modern household includes a minimum 150-amp. 220 V. installation comprising a service head hookup from utility company power lines, a usage meter, an entrance service panel (also referred to a "fuse box") including protective devices such as fuses and/or circuit breakers, and multiple branch circuits for distributing electrical power throughout the house to appliances, lighting and wall outlets. The circuits characteristically employ one or more "hot" wires, a "neutral" wire and usually a "ground" wire combined in a single sheathing. All wires, except for the ground wire, are normally individually insulated to keep them from touching and causing a short.

One of the most common wires used in household electrical systems is type T wire which is wrapped in thermal plastic insulation. The usual cabling is NM or nonmetallic sheath cable (commonly called "Romex") comprising two or more individually insulated type T wires and a bare copper grounding wire, all coated with a plastic sheath. The wires may be directly embedded in the cable itself (type NMC or UF cable) or have space filled with jute (type NM cable). Household circuits may also employ armored cable (commonly called "BX") wherein the wires are wrapped in heavy paper and surrounded by a spiral sheath of flexible steel or aluminum. Armored cable is rarely found in newly constructed homes.

Protection for current overloads and short circuits is conventionally provided by fuses and circuit breakers. Fuses generally comprise elongated metal wires through which the electrical current is caused to flow and which melt ("blow") when too much current is applied. This results in a gap or "open circuit" through which electricity can no longer flow, thus cutting off power. The fuse is designed to blow if the electricity requirements of the appliances and other electrical devices plugged into a particular circuit exceed the amperage rating of that circuit. The fuses will also blow if wires directly touch one another causing a short circuit. Circuit breakers are switches that act similarly to fuses for protecting circuits. However, instead of permanently severing a wire when an overload occurs, the breaker is "tripped" to switch from an "on" to an "off" position. Once the overload problem has been corrected, the breaker can simply be reset by switching it back to the "on" position.

While fuses and circuit breakers both provide protection for current overloads and short circuits, neither provides protection against the "partial short circuit." This condition exists when a current load that does not reach the overload rating of the circuit's conventional protection flows through the wires, but nevertheless causes excessive heat sufficient to present a risk of fire. Three examples of occurrences of this problem are as follows:

1. A mouse chewed off properly rated, nonmetallic-sheathed "Romex" cable in an attic of a house. A hot electrical wire partially shorted to the ground causing a fire. Fortunately, the wire melted apart and terminated the current flow, before any serious damage occurred. Electricity to the load side was interrupted, but the circuit breaker did not trip.

2. An air conditioner compressor fan switch mounted on the side of a house corroded causing the outside unit to not function. Upon throwing the switch to check for proper operation, the switch's internal components shorted causing a fire on the side of the house. The fire continued until the 60-amp. circuit breaker in the garage was tripped. Upon closer examination, it was observed that the wires going to the outside switch melted off the switch and continued to stay shorted as insulation melted away.

3. A telephone installer drilled a hole in the side of a house to install a jack. The main electrical service for the house was on the other side of the wall. The drill bit shorted the main feed to the home service panel box inside the house. The box became so hot that it set fire to the surrounding paneling. Aerial wire to the house became so hot that it broke away from the house and continued to stay shorted setting fire to the yard.

A ground fault circuit interrupter (GFCI) provides protection against shock due to a "ground fault." A ground fault can occur when a bare hot wire touches a grounded wire, an armored cable, a metal conduit or the current is otherwise redirected from its normal path to ground. The GFCI monitors the equal current in the "hot" and "neutral" wires, and shuts off all current if there is a drop in the return current. Receptacle versions of GFCI devices, if installed on a first receptacle of a circuit, will usually also protect against ground faults that might occur at other receptacles or devices in the same circuit. GFCIs are also available that are installed directly in the breaker panel and combine a breaker switch with a GFCI. Such combination protects against overloads, shorts and ground faults. The partial short circuit discussed above, which overheats a wire and may cause a fire, may not result in an inequality between outgoing and return currents, so may not trip the GFCI.

SUMMARY OF THE INVENTION

It is an object of the invention to provide a mechanism for protecting an electrical wiring system, such as a modern household electrical service, against overheating which does not cause a current capacity overload, short circuit or ground fault against which conventional protective devices protect.

In accordance with the invention, an electrical wire system is augmented by running a sensor wire, along with hot, neutral and ground wires, within the cable throughout the electrical service. One end of the sensor wire in each hookup and branch service path is connected to a sensor monitoring circuit, and the other end is either directly or through the cord of each electrical device connected to ground. Changes in the sensor wire caused by overtemperature applied to the cable, are detected at the sensor monitoring circuit and a circuit breaker, GFCI, or other circuit interrupting element is tripped in response thereto, to break the current.

In the first embodiment, described in greater detail below, the sensor wire may take the form of a lead or lead fabric wire run within the usual electrical cabling throughout an electrical wiring system. The lead wire is attached to ground at the load end of each branch circuit and to a sensor input to a circuit breaker on the source end. Should the wire become subject to overtemperature at any point along its length, it melts and activates a control circuit in the breaker that trips the circuit.

An alternative embodiment, also discussed below, utilizes a temperature sensitive fiber optic lead in place of the electrically conductive lead wire. An LED light source is placed at the load side and the sensor system is placed at the source side. As the temperature of the fiber optic wire increases, the light path changes from translucent to dark, thus stopping the light flow which trips the circuit. In addition to protecting the branch circuits, a sensor wire is also placed along the feed from the power company, so that any temperature increase between the outside transformer and the meter box, or the meter box and the service panel, will shut down electrical service to the structure.

For extending the same protection to the cords of electrical appliances that plug into receptacles, a "duplex" style plug may be provided with a special "split" ground prong, to assure sensing overtemperature protection all the way to the actual load.

BRIEF DESCRIPTION OF THE DRAWINGS

Embodiments of the invention have been chosen for purposes of illustration and description, and are shown in the accompanying drawings wherein:

FIG. 1 is an overall view of a household electrical wiring system including an overtemperature protective mechanism in accordance with the invention;

FIG. 2 is a fragmentary perspective view of a nonmetallic sheath cable usable in the electrical system of FIG. 1;

FIG. 3 is a view of a receptacle wired for the extension of overtemperature protection all the way to the plugged in electrical device;

Throughout the drawings, like elements are referred to by like numerals.

DETAILED DESCRIPTION OF PREFERRED EMBODIMENTS

Figure 4:
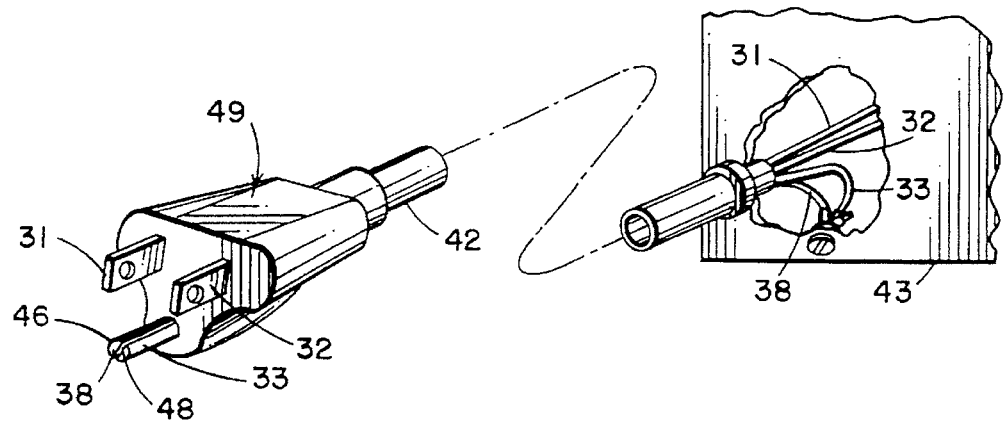
FIG. 4 is a view of an electrical device plug and cord usable with the receptacle of FIG. 3.

As shown in FIG. 1, a modern household electrical service includes an elevated service head 10 having an entry port 11 into which hot wire, neutral wire and ground wire lines 12, 13, 14 are directed from the power company pole-top step-down transformer via vertical conduit 15 to a standard usage meter 17. From meter 17, the same lines 12, 13, 14 are then wired through a breaker type, main entrance switch 18 to the input terminal of a bank of breakers and/or fuses 19 installed in a service panel fuse box 20. Each breaker or fuse 19 is wired to protect a different branch circuit 21, 22 which distributes electrical power in the house to a different one or more appliances, lighting fixtures, wall outlet receptacles, or the like. For illustrative purposes, FIG. 1 shows a first branch circuit 21 wired to provide power to a wall receptacle 24; and a second branch circuit 22 wired to provide power under control of a toggle switch 25 to a lighting fixture 26. Connections between the breaker or fuse 19 and the electrical elements 24, 25, 26 is made using nonmetallic sheath cabling 28 (FIG. 2) comprising hot, neutral and ground wires 31, 32, 33 embedded in a plastic insulative sheath 34. Connection of wires 31, 32, 33 are made in conventional manner. For the illustrated wiring, wire 31 is a black wire (with wire 31' being a white coded black wire), wire 32 is a white wire and wire 33 is a green or unjacketed copper ground wire.

In accordance with the first implementation of the invention, a sensor wire line 36 is run coextensively with the lines 12, 13, 14 between the step-down transformer and main entrance switch 18, and also between main entrance switch 18 and service panel 20. A sensor wire 38 is similarly run coextensively with wires 31, 32, 33 within nonmetallic sheath cabling 28 (FIG. 2) from service panel 20 throughout each branch circuit 21, 22. As with wires 31, 32, 33, sensor wire 38 may be directly embedded in plastic sheath 34.

For each run of electrical service to be protected, a source end of line 36 or wire 38 is connected to a control circuit of a breaker or other circuit interrupting device and a load end of the same line 36 or wire 38 is connected to ground line 14 or ground wire 33. Thus, as shown in FIG. 1, the source end of a first run of line 36 connects to a power interrupting control circuit at the output to the step-down transformer and the load end of the same first run connects to ground line 14 at the metal housing of main entrance switch 18. A second run of line 36 has its source end connected to a control circuit wired to control tripping of main breaker 18, and its load end connected to ground line 14 at the metal housing of service panel 20. For protection of each branch circuit 21, 22, a run of sensor wire 38 has a source end connected to a control circuit wired to trip a respective branch circuit breaker 19, and a load end connected to ground 33 at the last electrical element of the branch. Thus, in the illustrated example, sensor wire 38 is shown passing through the octagon box 39 of middle-of-the-run lighting fixture 26 and connected to ground wire 33 at rectangular Gem box 40 of switch 25. Similarly, sensor wire 38 of branch circuit 21 is shown connected to ground wire 33 at rectangular Gem box 41 of end-of-the-run receptacle 24.

The sensor lines 36 and sensor wires 38 may comprise lengths of fusible, conductive material with predetermined low melting point, such as lead or lead fabric. The lengths are insulated from surrounding material and other lines or wires, except at their end connections. The source ends are connected to circuitry formulated in accordance with known techniques to interrupt power at the power company transformer, main breaker switch 18 or respective breaker 19, whenever the corresponding load end connection to ground is lost.

As shown in FIGS. 3 and 4, protection can be extended right through to the cords of electrical appliances. This is accomplished by withholding the connection of sensor wire 38 to ground wire 33, until the termination of electrical device cord 42 within the device 43 itself. This is particularly useful for heavy duty appliances, and especially ones for which cord 42 is either partially concealed or runs in a confined space. One method of accomplishing this is to provide a modified wall receptacle 24' (FIG. 3) wherein the female ground prong connection 45 is split into electrically isolated left and right halves for receiving corresponding electrically isolated left and right halves of a plug male ground prong 46 (FIG. 4). One half of female connection 45 is connected to ground wire 33 and the other half is connected to sensor wire 38. Likewise, one half of male prong 46 is connected to cord wire 33 and the other half is connected to cord sensor wire 38. The halves are separated by insulating material 48 at both receptacle 24' and plug 49, so that wires 33, 38 remain unconnected until the load end of cord 42. The connection between wires 33, 38 is then made within the grounded housing of device 43.

Figure 5:
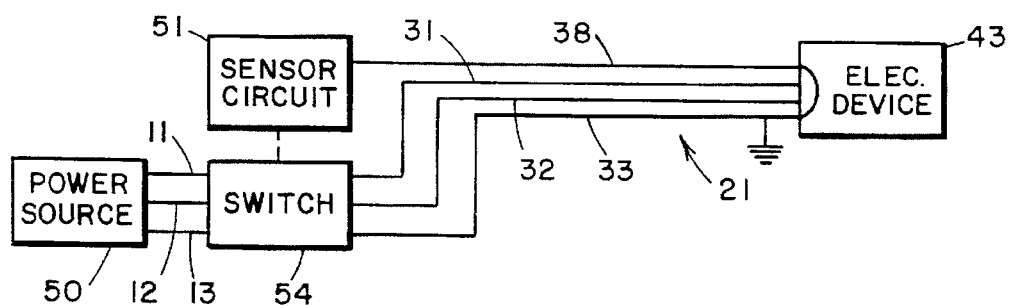
FIG. 5 is a block diagram of branch circuit incorporating overtemperature protection.

A block diagram of the overtemperature protective system of electrical branch circuit 21 is shown in FIG. 5. Power source 50 corresponds to the power company transformer and switch 54 corresponds to the particular service panel breaker 19 associated with branch circuit 21. Sensor circuit 51 acts to trip switch 19 to terminate power to wires 31, 32 whenever the connection of line 38 to ground is broken. This occurs when the temperature in the line pathways or cabling exceeds the melting point of the fusible material.

Circuit 51 and switch 19 may be combined into a single combined unit that fits into service panel 20, similar to GFCIs that combine a breaker with a circuit interrupter that installs directly into the breaker panel. As with the GFCI, alternative arrangements of circuit 51 are also possible which provide circuit interruption by placing a circuit 51 built into a receptacle. As with such built-in GFCI outlets, a circuit 51 installed in this manner on a first receptacle of a branch circuit 21, 22 will also protect against overtemperatures that might occur anywhere along the same branch circuit. For local protection of a particular device 43, a plug-in version of circuit 51 that fits into any three-slot outlet is also possible. Provision can also be made to combine the installations of receptacle 24 (FIG. 1) and 24' (FIG. 3), into a hybrid version that will connect sensor wire 38 to ground wire 33 at the receptacle when no plug 48 is present, but will withhold the connection until device 43 when plug 49 is present. This can be accomplished, for example, by providing a spring-loaded conductor normally joining the halves of female connection 45, but which is displaced to break the connection when male prong 46 is inserted.

Figure 6:
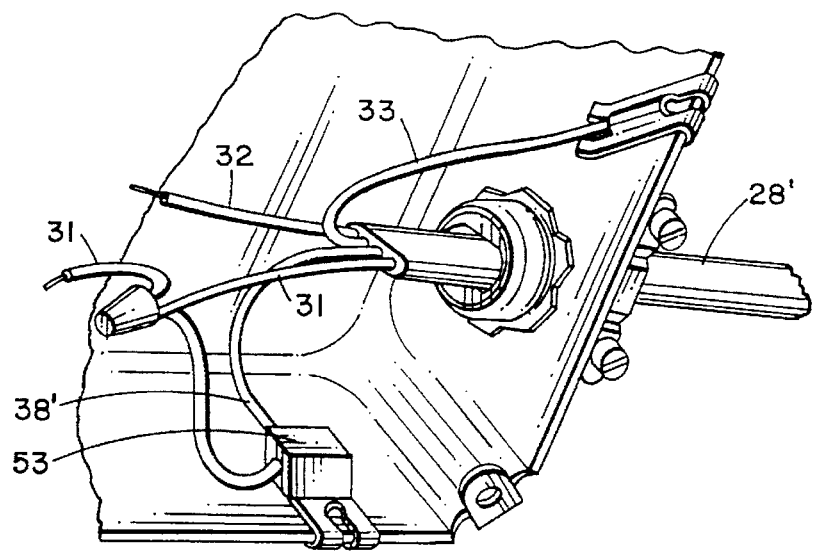
FIG. 6 shows the wiring for an electrical device protected with an optical sensor wire connection.

FIG. 6 illustrates a modified installation wherein an optical fiber sensor line or wire is used in place of a fusible conductor line or wire. Instead of connecting the load end of the sensor line or wire to ground, the load end is provided with an LED or similar light source circuit 53 which directs a light beam into an optical fiber wire 38' installed within cabling 28'. In this case, the sensor circuit 51 is modified to include light receptive transducer means for monitoring the strength of illumination. The optical path 38' is formulated to change its light transmission characteristics when exposed to heat and the sensor circuit can be set to monitor changes exceeding a predetermined threshold value. An advantage of optically transmissive sensor wire 38' over fusible wire 38 is that it does not require replacement after an overtemperature condition has been corrected. This same advantage can, of course, be provided by using a conductive material for wire 38 that changes resistance with temperature, rather than melting.

In operation, each run of the electrical system is protected by a coextensive length of sensor line or wire whose characteristics change with temperature. Those characteristics are monitored by control circuitry which shuts off power to the associated run when an overtemperature condition is detected. Thus, when lines 12, 13 or wires 31, 32 present a hazard due to increased temperature, but are not in an amperage overload, short or ground fault condition, the invention provides protection to shut power off when the usual protective devices would not do so.

Those skilled in the art to which the invention relates will appreciate that other substitutions and modifications can be made to the described embodiments without departing from the spirit and scope of the invention as described by the claims below.

What is claimed is:

1. In an electric power cable having at least three electrical conductors contained therein, the improvement comprising a fourth conductor contained in the cable and running coextensively with said electrical conductors, said fourth conductor exhibiting a substantial change in a conducting characteristic in response to heating of the cable above a preselected high temperature less than a melting point of the cable.

2. The improvement of claim 1 wherein said fourth conductor comprises an electrical conductor formed of a low temperature melting metal.

3. The improvement of claim 2 wherein said metal comprises lead.

4. In an electric power cable having at least three electrical conductors contained therein, the improvement comprising a fourth conductor contained in the cable and running coextensively with said electrical conductors, said fourth conductor comprising an optical fiber and exhibiting a substantial change in a conducting characteristic in response to heating of the cable above a preselected high temperature less than a melting point of the cable.

\* \* \* \* \*